United States Patent
Chanda

(10) Patent No.: US 9,948,577 B2
(45) Date of Patent: Apr. 17, 2018

(54) IP ALIASES IN LOGICAL NETWORKS WITH HARDWARE SWITCHES

(71) Applicant: Nicira, Inc., Palo Alto, CA (US)

(72) Inventor: Anupam Chanda, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 81 days.

(21) Appl. No.: 15/011,438

(22) Filed: Jan. 29, 2016

(65) Prior Publication Data

US 2017/0093758 A1 Mar. 30, 2017

Related U.S. Application Data

(60) Provisional application No. 62/234,976, filed on Sep. 30, 2015.

(51) Int. Cl.
*H04L 12/931* (2013.01)
*H04L 29/12* (2006.01)

(52) U.S. Cl.
CPC ............ *H04L 49/35* (2013.01); *H04L 61/103* (2013.01); *H04L 61/2007* (2013.01); *H04L 61/6022* (2013.01)

(58) Field of Classification Search
CPC ....... H04L 41/20; H04L 49/35; H04L 61/103; H04L 61/2007; H04L 61/6022
See application file for complete search history.

(56) References Cited

U.S. PATENT DOCUMENTS

| | | | |
|---|---|---|---|
| 5,526,484 A | * | 6/1996 | Casper .................. G06F 13/126 709/237 |
| 6,243,394 B1 | | 6/2001 | Deng |
| 6,640,251 B1 | | 10/2003 | Wiget et al. |
| 6,850,529 B1 | | 2/2005 | Wong |
| 7,463,639 B1 | | 12/2008 | Rekhter |
| 8,161,095 B2 | | 4/2012 | Manion et al. |
| 8,345,688 B2 | | 1/2013 | Zhou et al. |
| 8,589,919 B2 | | 11/2013 | Smith et al. |
| 8,874,876 B2 | | 10/2014 | Bhadra et al. |
| 8,897,134 B2 | | 11/2014 | Kern et al. |
| 8,943,490 B1 | | 1/2015 | Jain et al. |
| 8,964,528 B2 | | 2/2015 | Casado et al. |
| 9,014,181 B2 | | 4/2015 | Lakshman et al. |
| 9,032,095 B1 | | 5/2015 | Traina et al. |
| 9,100,285 B1 | | 8/2015 | Choudhury et al. |
| 9,154,433 B2 | | 10/2015 | Koponen et al. |

(Continued)

FOREIGN PATENT DOCUMENTS

EP 1154601 11/2001

*Primary Examiner* — Benjamin H Elliot, IV
(74) *Attorney, Agent, or Firm* — Adeli LLP

(57) ABSTRACT

Some embodiments provide a novel method of configuring a managed hardware forwarding element (MHFE) that implements a logical forwarding element (LFE) of a logical network to handle address resolution requests (e.g., Address Resolution Protocol (ARP) requests) for multiple addresses (e.g., IP addresses) associated with a single network interface of the logical network. The method identifies a physical port of the MHFE with which the multiple addresses are to be associated. The physical port is coupled to an end machine (e.g., a virtual machine, server, container, etc.) of the logical network. The method then modifies associations stored at the MHFE to associate the physical port with the multiple addresses.

15 Claims, 15 Drawing Sheets

(56) References Cited

U.S. PATENT DOCUMENTS

| | | | |
|---|---|---|---|
| 9,306,843 B2 | 4/2016 | Koponen et al. | |
| 9,319,375 B2 | 4/2016 | Gross, IV et al. | |
| 9,331,940 B2 | 5/2016 | Balus et al. | |
| 9,369,426 B2 | 6/2016 | Koponen et al. | |
| 9,397,946 B1 | 7/2016 | Yadav | |
| 9,455,901 B2 | 9/2016 | Davie et al. | |
| 9,485,149 B1 | 11/2016 | Traina et al. | |
| 9,577,927 B2 | 2/2017 | Hira et al. | |
| 9,621,461 B2 | 4/2017 | Sun | |
| 9,633,040 B2 | 4/2017 | Lee | |
| 9,667,541 B2 | 5/2017 | Song | |
| 2002/0065919 A1 | 5/2002 | Taylor et al. | |
| 2003/0041170 A1 | 2/2003 | Suzuki | |
| 2003/0163645 A1* | 8/2003 | Tremblay | G06F 9/383 711/137 |
| 2006/0092940 A1 | 5/2006 | Ansari et al. | |
| 2008/0189769 A1 | 8/2008 | Casado et al. | |
| 2008/0215586 A1 | 9/2008 | Pruet | |
| 2009/0006603 A1 | 1/2009 | Duponchel et al. | |
| 2011/0075674 A1 | 3/2011 | Li et al. | |
| 2011/0090911 A1 | 4/2011 | Hao et al. | |
| 2011/0206047 A1 | 8/2011 | Donthamsetty et al. | |
| 2011/0286326 A1 | 11/2011 | Awano | |
| 2011/0299537 A1 | 12/2011 | Saraiya et al. | |
| 2011/0317559 A1 | 12/2011 | Kern et al. | |
| 2012/0011106 A1 | 1/2012 | Reid et al. | |
| 2012/0236761 A1 | 9/2012 | Yang et al. | |
| 2012/0278802 A1 | 11/2012 | Nilakantan et al. | |
| 2012/0303835 A1 | 11/2012 | Kempf et al. | |
| 2013/0044636 A1 | 2/2013 | Koponen et al. | |
| 2013/0058351 A1 | 3/2013 | Casado et al. | |
| 2013/0121209 A1 | 5/2013 | Padmanabhan et al. | |
| 2013/0132533 A1 | 5/2013 | Padmanabhan et al. | |
| 2013/0287026 A1 | 10/2013 | Davie | |
| 2013/0315246 A1 | 11/2013 | Zhang et al. | |
| 2013/0322453 A1 | 12/2013 | Allan | |
| 2014/0029451 A1 | 1/2014 | Nguyen | |
| 2014/0029618 A1 | 1/2014 | Janardhanan | |
| 2014/0071986 A1 | 3/2014 | Isobe | |
| 2014/0101467 A1 | 4/2014 | Jubran et al. | |
| 2014/0195666 A1 | 7/2014 | Dumitriu et al. | |
| 2014/0229605 A1 | 8/2014 | Besser et al. | |
| 2014/0269709 A1 | 9/2014 | Benny et al. | |
| 2014/0301391 A1 | 10/2014 | Krishnan et al. | |
| 2015/0009992 A1* | 1/2015 | Zhang | H04L 49/354 370/392 |
| 2015/0100560 A1 | 4/2015 | Davie et al. | |
| 2015/0100675 A1 | 4/2015 | Davie et al. | |
| 2015/0100704 A1 | 4/2015 | Davie et al. | |
| 2015/0124586 A1 | 5/2015 | Pani | |
| 2015/0124809 A1 | 5/2015 | Edsall et al. | |
| 2015/0124821 A1* | 5/2015 | Chu | H04L 45/22 370/392 |
| 2015/0215189 A1 | 7/2015 | Lim | |
| 2015/0379150 A1 | 12/2015 | Duda | |
| 2016/0014073 A1 | 1/2016 | Reddy et al. | |
| 2016/0173535 A1 | 6/2016 | Barabash et al. | |
| 2016/0197824 A1 | 7/2016 | Lin et al. | |
| 2016/0232019 A1 | 8/2016 | Shah et al. | |
| 2016/0308690 A1 | 10/2016 | Chanda et al. | |
| 2017/0034002 A1 | 2/2017 | Sinn | |
| 2017/0085502 A1* | 3/2017 | Biruduraju | H04L 49/354 |
| 2017/0093617 A1* | 3/2017 | Chanda | H04L 41/12 |
| 2017/0093646 A1* | 3/2017 | Chanda | H04L 41/042 |
| 2017/0093758 A1* | 3/2017 | Chanda | H04L 49/35 |
| 2017/0126615 A1 | 5/2017 | Chanda et al. | |
| 2017/0171055 A1 | 6/2017 | Wang et al. | |

\* cited by examiner

IP ALIASES IN LOGICAL NETWORKS WITH HARDWARE SWITCHES

BACKGROUND

There is a growing movement, driven by both industry and academia, towards a new network control paradigm called Software-Defined Networking (SDN). In Software-Defined Networking (SDN), a control plane implements and maintains the control logic that governs the forwarding behavior of shared network switching elements on a per user basis. A logical network that is implemented for a tenant of a hosting system is a good example of an SDN. The virtual (logical) network of a tenant of the hosting system connects a set of data compute nodes (e.g., virtual machines, etc.) that are assigned to the tenant, to each other and to other virtual and/or physical networks through a set of logical switches and logical routers.

IP aliasing provides multiple IP addresses for a single interface in the logical network, allowing a single machine in a logical network to be reached by multiple, different addresses. One of the challenges in today's hosting system networks is providing ARP suppression for hardware virtual tunnel end points (VTEPs) when implementing IP aliasing for logical interfaces in the logical network.

BRIEF SUMMARY

Some embodiments provide a novel method of configuring a managed hardware forwarding element (MHFE) that implements a logical forwarding element (LFE) of a logical network to handle address resolution requests (e.g., Address Resolution Protocol (ARP) requests) for multiple addresses (e.g., IP addresses) associated with a single network interface of the logical network. The method identifies a physical port of the MHFE with which the multiple addresses are to be associated. The physical port is coupled to an end machine (e.g., a virtual machine, server, container, etc.) of the logical network. The method then modifies associations stored at the MHFE to associate the physical port with the multiple addresses.

Some embodiments provide a network control system that manages physical forwarding elements (e.g., hardware/software routers and switches) to implement logical networks. The network control system of some embodiments configures and manages physical forwarding elements of a physical network to implement one or more logical networks for one or more tenants of a hosting system (e.g., a datacenter or a collection of datacenters). The physical forwarding elements of some embodiments include both software (e.g., virtual switches operating in a hypervisor) and hardware forwarding elements (e.g., top of rack switches).

In some embodiments, the MHFEs act as virtual tunnel end points (VTEPs) for the logical network, tunneling logical network data through a network to other VTEPs at other managed forwarding elements (hardware and/or software), which are coupled to other end machines of the logical network. The network control system of some embodiments manages the VTEPs of the MHFEs (or hardware VTEPs) by configuring a configuration database of the hardware VTEP through a configuration protocol (e.g., OVSDB protocol). The configuration database of some embodiments is structured according to a standardized configuration database schema that is shared with various third party manufacturers of the MHFEs. In the configuration database schema, network layer addresses (e.g., Internet Protocol (IP) addresses) are associated with a data link layer address (e.g., Media Access Control (MAC) address), which is associated with a logical port of a logical switch in the logical network.

In some embodiments, it is desirable to assign multiple network layer addresses (i.e., alias addresses) for a single logical data link layer address (e.g., MAC address) in the logical network, but current implementations of the configuration database schema do not allow for multiple alias addresses to be associated with a single logical data link layer address. Some embodiments work within the existing configuration database schema (e.g., OVSDB schema) to alleviate problems with excessive address resolution requests or to provide complete ARP suppression for multiple address aliases in a logical network.

The network control system of some embodiments alleviates the issues with address resolution in conjunction with alias addresses in a logical network by weighting the various alias addresses based on network traffic to each of the alias addresses. The network control system programs the highest weighted alias address into the configuration database of the hardware VTEP, allowing the hardware VTEP to suppress address resolution requests for at least the most frequently used alias address.

In some embodiments, the network control system provides ARP suppression for multiple alias addresses of a logical interface by associating the multiple alias addresses with the data link layer address of the logical interface in the configuration database. In some embodiments, the network control system stores a delimited string (e.g., "192.168.1.1; 192.168.1.3") of alias addresses in the configuration database. Alternatively, or conjunctively, the network control system of some embodiments stores one or more ranges (e.g., "192.168.1.1-192.168.1.4") of consecutive addresses in the configuration database. The hardware VTEPs use the delimited string and/or the ranges of consecutive addresses to perform ARP suppression for the alias addresses.

The network control system of some embodiments modifies the existing configuration database schema to provide ARP suppression for alias addresses in a logical network. In some embodiments, the configuration database schema is modified to include a new address list table for storing alias address lists. In some embodiments, the address list table uses a unique identifier (e.g., a Universally Unique Identifier (UUID)) as a key for each address list. The unique identifier is then stored in the existing table to point to the address list table, allowing the MHFE to perform ARP suppression based on the alias address list for each logical port.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1A:
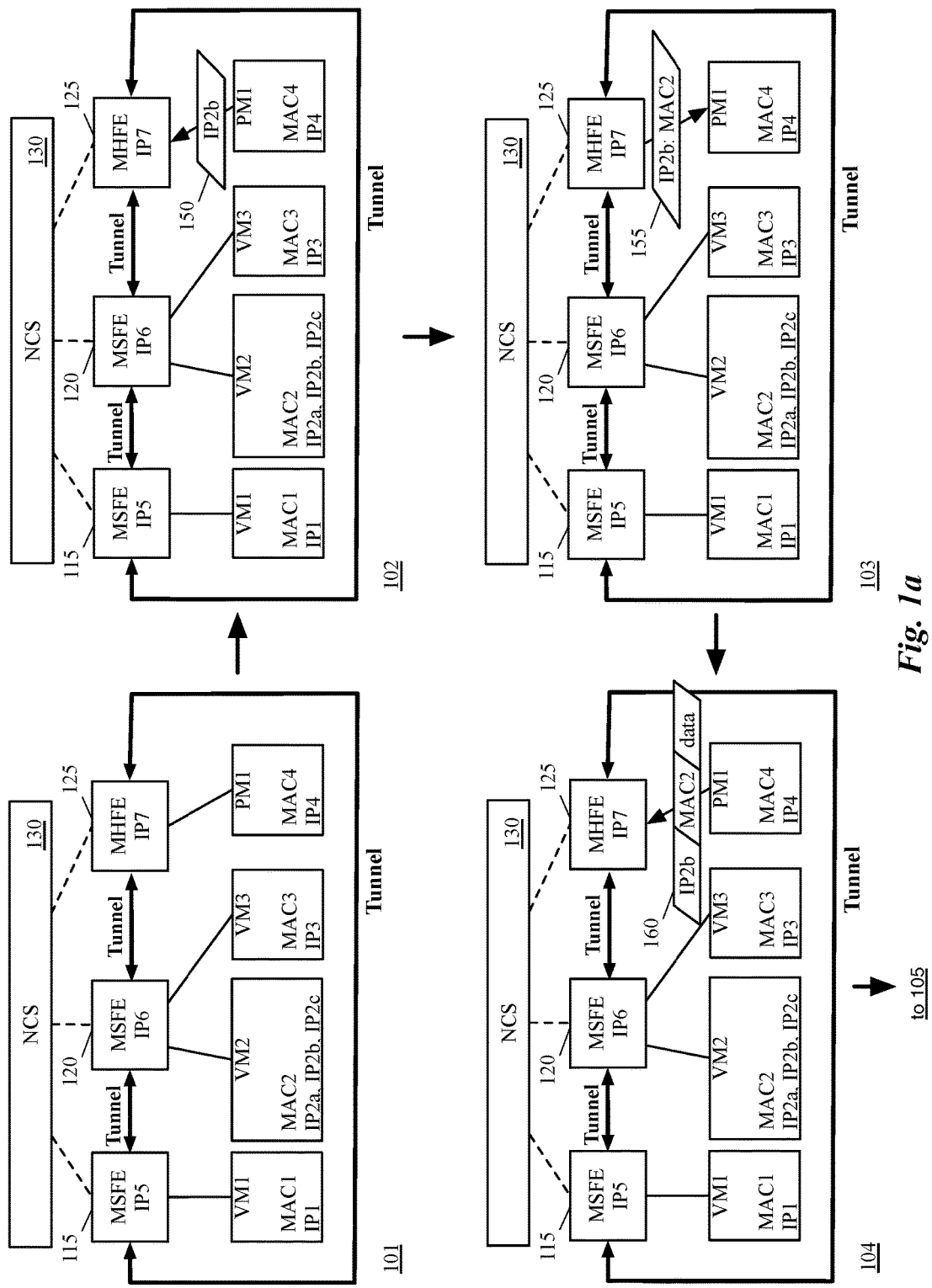
FIGS. 1a-b illustrate an example of ARP suppression with IP aliasing for a logical network.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a novel method of configuring a managed hardware forwarding element (MHFE) that implements a logical forwarding element (LFE) of a logical network to handle address resolution requests (e.g., Address Resolution Protocol (ARP) requests) for multiple addresses (e.g., IP addresses) associated with a single network interface of the logical network. The method identifies a physical port of the MHFE with which the multiple addresses are to be associated. The physical port is coupled to an end machine (e.g., a virtual machine, server, container, etc.) of the logical network. The method then modifies associations stored at the MHFE to associate the physical port with the multiple addresses.

Some embodiments provide a network control system that manages physical forwarding elements (e.g., hardware/software routers and switches) to implement logical networks. The network control system of some embodiments configures and manages physical forwarding elements of a physical network to implement one or more logical networks for one or more tenants of a hosting system (e.g., a datacenter or collection of datacenters). The physical forwarding elements of some embodiments include both software (e.g., virtual switches operating in a hypervisor) and hardware forwarding elements (e.g., top of rack switches).

In some embodiments, the MHFEs act as virtual tunnel end points (VTEPs) for the logical network, tunneling logical network data through a network to other VTEPs at other managed forwarding elements (hardware and/or software), which are coupled to other end machines of the logical network. The network control system of some embodiments manages the VTEPs of the MHFEs (or hardware VTEPs) by configuring a configuration database of the hardware VTEP through a configuration protocol (e.g., OVSDB protocol). The configuration database of some embodiments is structured according to a standardized configuration database schema that is shared with various third party manufacturers of the MHFEs. In the configuration database schema, network layer addresses (e.g., Internet Protocol (IP) addresses) are associated with a data link layer address (e.g., Media Access Control (MAC) address), which is associated with a logical port of a logical switch in the logical network.

In some embodiments, it is desirable to assign multiple network layer addresses (i.e., alias addresses) for a single logical data link layer address (e.g., MAC address) in the logical network, but current implementations of the configuration database schema do not allow for multiple alias addresses to be associated with a single logical data link layer address. Some embodiments work within the existing configuration database schema (e.g., OVSDB schema) to alleviate problems with excessive address resolution requests or to provide complete ARP suppression for multiple address aliases in a logical network.

The network control system of some embodiments alleviates the issues with address resolution in conjunction with alias addresses in a logical network by weighting the various alias addresses based on network traffic to each of the alias addresses. The network control system programs the highest weighted alias address into the configuration database of the hardware VTEP, allowing the hardware VTEP to suppress address resolution requests for at least the most frequently used alias address.

In some embodiments, the network control system provides ARP suppression for multiple alias addresses of a logical interface by associating the multiple alias addresses with the data link layer address of the logical interface in the configuration database. In some embodiments, the network control system stores a delimited string (e.g., "192.168.1.1; 192.168.1.3") of alias addresses in the configuration database. Alternatively, or conjunctively, the network control system of some embodiments stores one or more ranges (e.g., "192.168.1.1-192.168.1.4") of consecutive addresses in the configuration database. The hardware VTEPs use the delimited string and/or the ranges of consecutive addresses to perform ARP suppression for the alias addresses.

The network control system of some embodiments modifies the existing configuration database schema to provide ARP suppression for alias addresses in a logical network. In some embodiments, the configuration database schema is modified to include a new address list table for storing alias address lists. In some embodiments, the address list table uses a unique identifier (e.g., a Universally Unique Identifier (UUID)) as a key for each address list. The unique identifier is then stored in the existing table to point to the address list table, allowing the MHFE to perform ARP suppression based on the alias address list for each logical port.

Figure 1B:
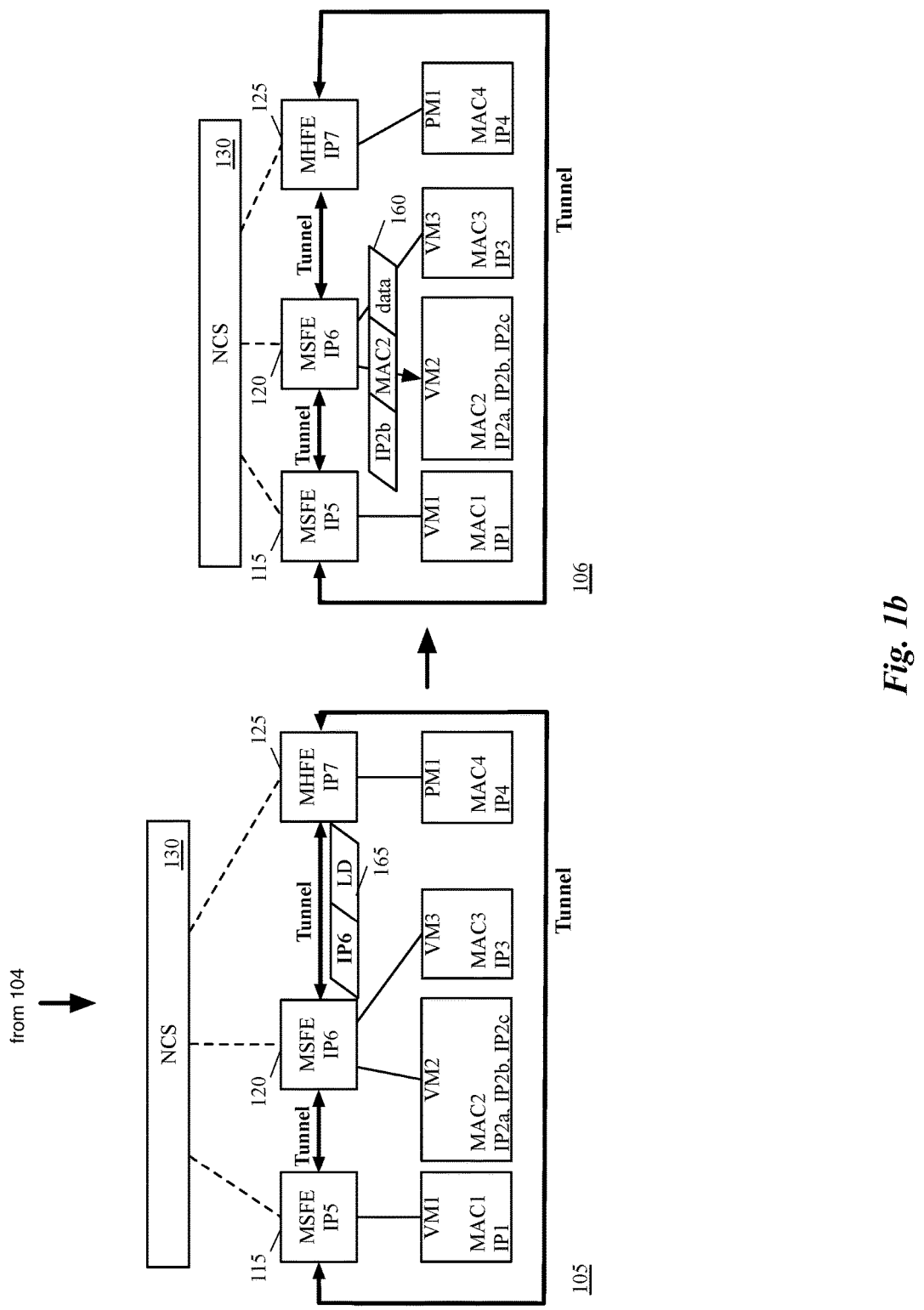

FIGS. 1a-b illustrate an example of ARP suppression with IP aliasing for a logical network in six stages 101-106. In this example, several end machines (virtual machines (VM1-VM3) and physical machines (PM1)) are connected to each other through a logical network (not shown). Each of the end machines VM1-VM3 and PM1 has a data link layer address (i.e., MAC addresses MAC1-MAC4) and one or more network layer addresses. Specifically, end machines VM1, VM3 and PM1 each have one network layer address (i.e., IP addresses IP1, IP3, and IP4 respectively), while VM2 has multiple network layer addresses (i.e., IP addresses IP2a-IP2c). The data link layer and network layer addresses are used to identify an interface (and port) for each end machine within the logical network.

The first stage 101 shows various machines (i.e., VM1-VM3 and PM1) that communicate through managed forwarding elements 115, 120, and 125 of a physical network. While shown as virtual machines (VM1-VM3) and physical machines (PM1) in this figure and other figures below, it should be understood that other types of data compute nodes (e.g., namespaces, containers, etc.) may connect to the managed forwarding elements (and the logical network) in some embodiments.

A network control system 130 configures (as shown by the dashed lines) the managed forwarding elements 115, 120, and 125 to tunnel network data of the end machines between the managed forwarding elements 115, 120, and 125. Each of the managed forwarding elements 115, 120, and 125 operates as a virtual tunnel end point (VTEP) for the tunnels to the other managed forwarding elements. As a VTEP, the managed forwarding elements of some embodiments tunnel the network data for the machines through a network (e.g., the Internet) by encapsulating and decapsulating the network data with overlay network information. Although in the illustrated example, as well as other examples below, only one MHFE and two MSFEs are shown, one of ordinary skill in the art would realize that any number of MHFEs and MSFEs can connect to the logical network (or multiple logical networks) in the same manner.

In this example, the managed forwarding elements 115, 120, and 125 include both managed software forwarding elements (MSFEs) and managed hardware forwarding elements (MHFEs). The MSFEs of some embodiments are virtual switches (e.g., Open vSwitch, Elastic Sky X (ESX), etc.) that run within the hypervisor of host machines and connect to end machines operating on the host machine, such as virtual machines and/or containers. The MHFEs of some embodiments are hardware forwarding elements (e.g., a third-party hardware switch such as a top-of-rack (TOR) switch) that connect to machines (e.g., third-party servers connected to a TOR switch, VMs operating on a server without a virtual switch that performs logical network processing, etc.) to exchange network data with other end machines and/or external networks that are connected to the logical network.

In the second stage 102, physical machine PM1 needs to send a data message to network layer address IP2b for virtual machine VM2, but does not have a data link layer address for virtual machine VM2. Physical machine PM1 needs a data link layer address for virtual machine VM2 because, in the logical network, physical machine PM1 and virtual machine VM2 are connected to the same logical forwarding element.

The second stage 102 shows that physical machine PM1 sends an address resolution request 150 to MHFE 125 to retrieve the L2 address for alias address IP2b of virtual machine VM2. In some embodiments, the MHFE 125 then determines whether it is able to respond to the address resolution request.

In many implementations, the MHFEs use a standardized database schema that allows a controller (e.g., local controller) to specify a single L3 address for each port (and/or L2 address) of the logical forwarding elements. When the network control system 130 specifies a L2 address for an address resolution request, the MHFE 125 is able to perform ARP suppression, also known as ARP proxy, handling the address resolution requests by crafting an ARP reply packet with the data link layer address of the requested network layer addresses from the logical network. By crafting the reply packet directly, the MHFE 125 avoids having to broadcast (or multicast) the ARP request to all of the other logical ports of the logical switch (i.e., to all of the MFEs that implement the logical ports of the logical switch).

However, in the current standardized database schema, certain issues may arise when IP aliasing is implemented for ports and interfaces of the logical network. IP aliasing assigns multiple network layer addresses to a single port or interface in the logical network, and allows an end machine to be reached by any of the multiple network layer addresses. In this example, the network layer address IP2b is one of three alias addresses (IP2a-IP2c) for virtual machine VM2. In some cases, the different addresses are backup addresses or associated with different services of the end machine. With IP aliasing, the data link layer address of each interface remains the same, so even if multiple network layer addresses are assigned to an interface, layer 2 connectivity would continue to work.

However, in the logical network, address resolution using the current configuration database schema would be suboptimal because only a single address can be specified for each interface (or port) on the logical network. ARP suppression, as described above, would only work for a single network layer address. The MHFE 125 would have to broadcast or multicast all ARP requests for any of the other alias addresses.

In some embodiments, the network control system 130 works to alleviate the problem of excess ARP requests by configuring the MHFE 125 to handle a primary address (i.e., a most heavily weighted address) for each aliased port (or interface) based on network traffic to the different alias addresses. In other embodiments, the network control system 130 configures the MHFE 125 to handle multiple alias addresses for each interface by associating multiple addresses with the aliased logical port. These embodiments are described in further detail below in Sections II and III.

Once the MHFE 125 determines that it is able to handle the address resolution request, the third stage 103 shows that MHFE 125 crafts and sends back an ARP reply 155 with the MAC address MAC2 of VM2, which corresponds to the desired IP IP2b.

In the fourth stage 104, the physical machine PM1 sends a data message 160 destined to virtual machine VM2 with an alias address IP2b and the MAC address MAC2. The data message 160 indicates both the network layer address (IP2b) and the L2 address (MAC2) for the destination machine VM2, sending the packet as it would if PM1 were connected to a same forwarding element as VM2.

However, in order to implement the logical forwarding element, the MHFE 125 must then encapsulate the data message 160 to tunnel it to the VTEP of the destination end machine VM2. In some embodiments, the header (tunnel) information is configured by the network control system 130, which distributes configuration data to the MSFEs 115 and 120 and MHFE 125. For instance, the configuration data of some embodiments specifies the location (e.g., IP address) of each VTEP for each port of the logical forwarding elements associated with each managed forwarding element. In some embodiments, each VTEP (or MHFE) uses ARP requests to discover and maintain the network layer addresses for the other VTEPs.

The MHFE 125 of some embodiments uses configuration data received from the network control system 130 to identify the corresponding network layer address (IP6) for MSFE 120, which connects to the destination end machine VM2. The fifth stage 105 shows that the MHFE 125 takes the data message 160 and encapsulates it with a new header that includes the network layer address (IP6) for MSFE 120, and sends the encapsulated data message 165 to the VTEP (MSFE 120) for the destination end machine VM2.

Finally, in the sixth stage 106, the destination MSFE 120 removes the tunnel header and sends the decapsulated data message 160 to the destination end machine VM2.

An overview of the process for implementing IP aliasing for a logical network through MHFEs has been described above. Further details and examples of implementing IP aliasing are described below. Specifically, Section II describes using weighting to alleviate issues with IP aliasing in a logical network. Section III then describes examples of providing ARP suppression for IP aliases in a logical network. Section IV then describes an electronic system with which some embodiments of the invention are implemented. However, before describing these additional examples, the environment in which some embodiments of the invention are implemented will be described below in Section I.

I. Environment

The following section will describe the environment in which some embodiments of the invention are implemented. In some embodiments, a logical network of the hosting system defines a set of logical forwarding elements (e.g., logical switches and routers) that logically connects a group of end machines (e.g., virtual machines, containers, servers, etc.) and are implemented on resources of a physical network. The relationship between the logical and physical networks will be described in greater detail below with reference to FIG. 3.

Figure 2:
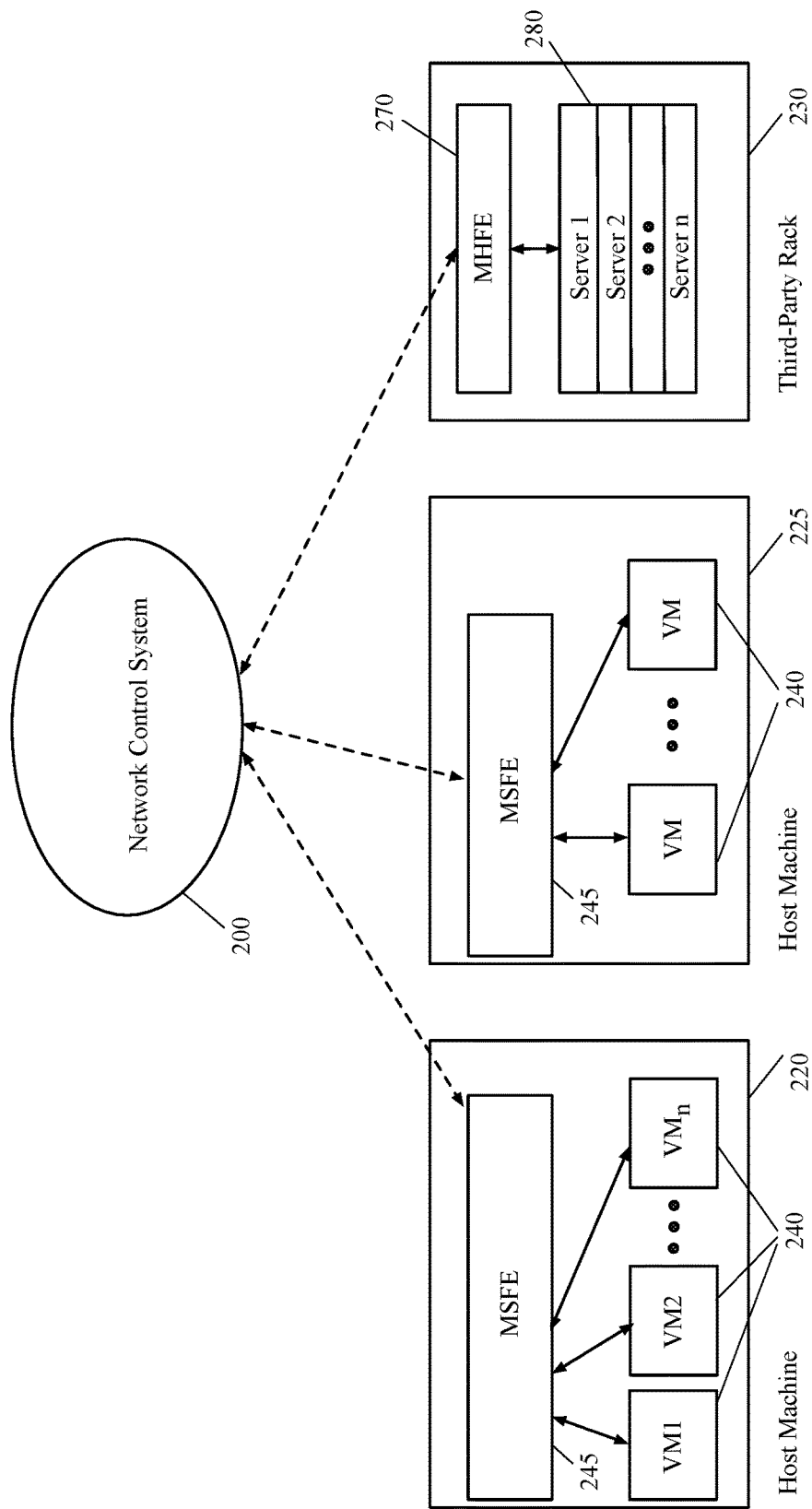
FIG. 2 illustrates a network control system that configures and manages both software forwarding elements and hardware forwarding elements to implement one or more logical networks.

FIG. 2 illustrates an example of a network control system of some embodiments that configures and manages both software forwarding elements and hardware forwarding elements to implement one or more logical networks (e.g., for one or more tenants of a hosting system (e.g., a datacenter or collection of datacenters)). The figure shows a network control system 200, host machines 220 and 225, and a third-party rack 230.

The network control system 200 of some embodiments includes a set of controllers that perform various functions for implementing the logical network. Although shown as separate from the host machines 220 and 225, in some embodiments the network control system 200 includes controllers that operate within the host machines 220 and 225 and/or within the MHFE 270 of the third-party rack 230. Some embodiments of the network control system are described in further detail below.

Host machines 220 and 225 each include a managed software forwarding element (MSFE) 245 and a set of compute nodes (e.g., end machines) 240 (in this example, virtual machines). The MSFE 245 forwards logical network data for the set of compute nodes through the network. In some embodiments, the MSFE 245 is implemented in virtualization software that operates on the host machine.

The third-party rack 230 includes a managed hardware forwarding element (MHFE) 270, and a set of servers 280 that are connected to the MHFE 270. The MHFE 270 is a hardware device that forwards logical network data for the set of servers 280 through the network. In some embodiments, the servers 280 include host machines for VMs that operate on legacy hypervisors of the host machines. The legacy hypervisors of some embodiments do not support logical networks and/or tunneling. In some such embodiments, the legacy hypervisor operating on a host machine (i.e., one of the servers 280) sends the network traffic for the VMs operating on the host machine to the MHFE 270 to perform tunneling and logical processing for the VMs.

In some embodiments, the managed forwarding elements MSFEs 245 and MHFE 270 tunnel network data between themselves, serving as virtual tunnel end points (VTEPs) that encapsulate and decapsulate the logical network data of the end machines to be sent between the VTEPs. Software VTEPs of some embodiments enable compute nodes operating on host machines to communicate through tunnels with other end machines and/or networks on a logical network. Hardware VTEPs enable the physical workloads connected to the MHFE (e.g., third-party servers connected to a TOR switch) to exchange network data with other end machines and/or external networks that are connected to other software/hardware forwarding elements of the logical network. In some embodiments, the VTEPs directly couple to at least one of the end machines of the logical network.

The network control system 200 of some embodiments manages and configures both software and hardware VTEPs to create the tunnels (e.g., a Virtual Extensible LAN (VXLAN) tunnel, a Stateless Transport Tunneling (STT) tunnel, etc.) between the VTEPs, using local controllers that each manage one of the VTEPs at the managed forwarding elements. In some embodiments, the local controllers for software and hardware VTEPs use different protocols (e.g., NETCPA protocol, Open vSwitch Database Management (OVSDB) protocol, OpenFlow protocol, etc.) and configuration database schemas for the software and hardware forwarding elements, or for different functions (e.g., forwarding and tunnel creation) performed for the forwarding elements. In some embodiments, the local controllers for a hardware VTEP uses a common configuration database schema (e.g., OVSDB schema) to control and configure the hardware VTEP devices.

One of ordinary skill in the art would realize that the number of the host machines, third-party racks, and MHFEs illustrated in the figure are exemplary and a logical network for a tenant of a hosting system may span a multitude of host machines and third-party devices, and logically connect a large number of end machines to each other and to several other third-party devices. Also, one of ordinary skill in the art would realize that even though the machines that are connected to the MHFE in this example are servers in a third-party rack, any other third-party device (e.g., computer, printer, etc.) could be connected to the logical networks through the MHFE.

In some embodiments, the network control system 200 receives (e.g., through an application programming interface (API)) a definition of a logical forwarding element of the logical network from a user (e.g., a network administrator, a tenant of a datacenter, etc.) of the network control system 200. The network control system 200 then implements logical networks on managed forwarding elements of a physical network by configuring managed forwarding elements (i.e., MSFEs 245 and MHFE 270) of the physical network to forward network data between the end machines (e.g., VMs and servers) attached to each of the managed forwarding elements according to the forwarding logic of the set of logical forwarding elements. In some embodiments, the network control system 200 assigns a network layer (e.g., Internet Protocol (IP)) address and a data link layer (e.g., Media Access Control (MAC)) address for each of the logical ports of the logical forwarding element.

A logical network logically connects a set of end machines (e.g., virtual machines, physical servers, containers, etc.) and a set of physical machines (and other resources of the physical network) using a set of logical forwarding elements (e.g., logical L2 and L3 switches). This allows the physical resources of a physical network to be allocated and shared while maintaining a logical separation between the end machines of the different logical networks.

Figure 3:
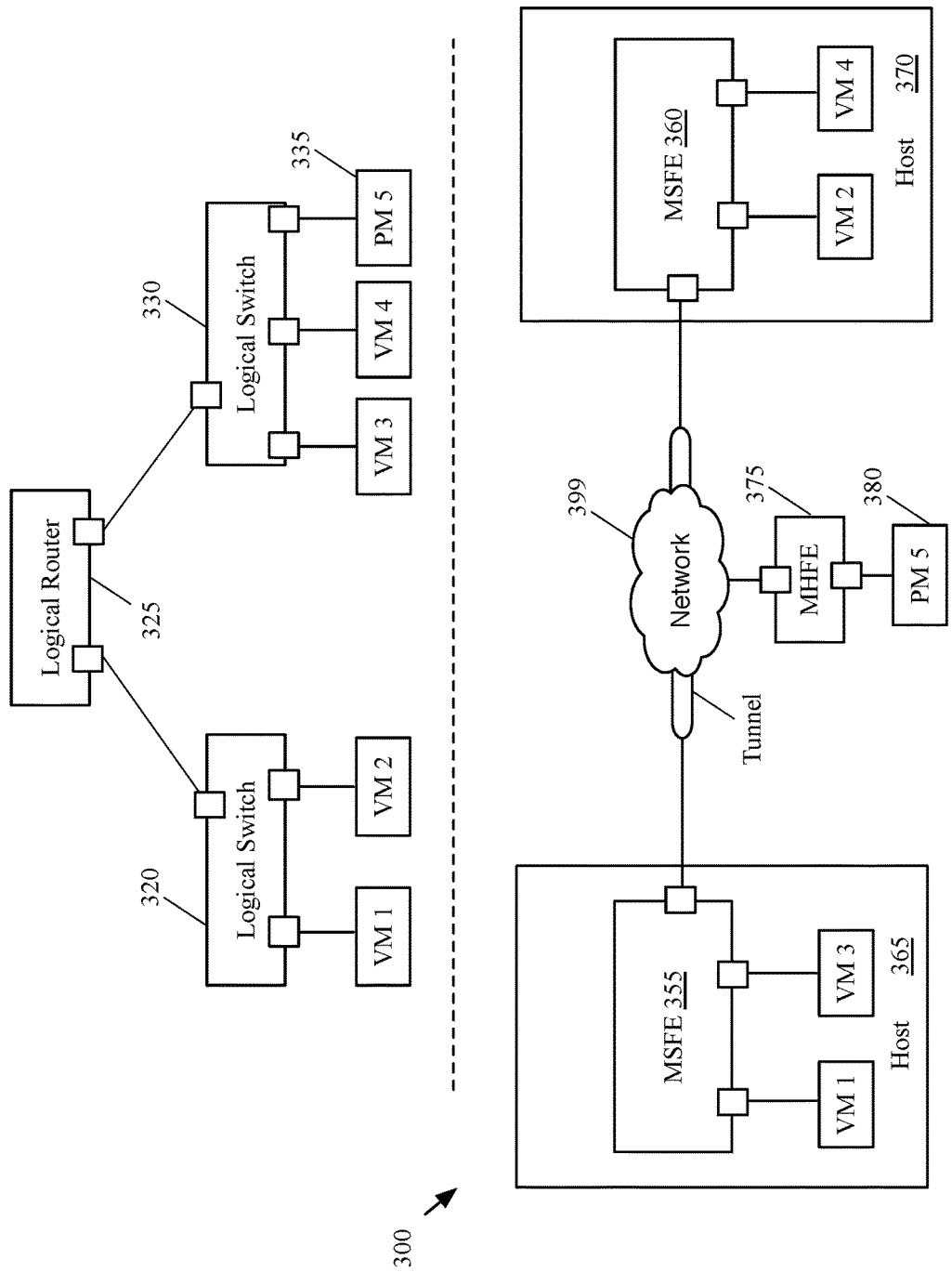
FIG. 3 conceptually illustrates an example of a logical network that connects a set of end machines to a physical machine.

FIG. 3 conceptually illustrates an example of a logical network that is implemented on a physical network. This figure shows end machines (VMs 1-4 and PM5) that are logically connected according to a logical network 300, while being physically connected according to a physical network 305.

The logical network 300 includes three logical forwarding elements (a logical router 325 and two logical switches 320 and 330) that describe the desired forwarding behaviors for the end machines VMs 1-4 in the logical network. In some embodiments, the virtual machines VMs 1-4 operate on virtualization software that executes on the host machines. Specifically, VMs 1 and 2 are connected through logical ports to a first logical switch 320. VMs 3 and 4 and physical machine PM 5 is connected through logical ports of a second logical switch 330. The two logical switches 320 and 330 are connected to ports of a logical router 325.

The physical network 305 shows the actual physical connections between the end machines VMs 1-4 and PM 5. Physical network 305 shows two hosts 365 and 370. The hosts 365 and 370 have MSFEs 355 and 360, which connect to VMs 1 and 3, and VMs 2 and 4, respectively. Physical network 305 also shows a MHFE (a hardware forwarding element) and a physical machine PM5 (e.g., server, baremetal machine, etc.) that is attached to a physical port of the MHFE 375. The MSFEs 355 and 360 and the MHFE 375 are connected to each other by tunnels through a network 399. The connections of the end machines to the logical switches as well as the connections of the logical switches to the logical router are defined using logical ports, which are mapped to the physical ports of the MSFEs 355 and 360 and of the MHFE 375.

The connections in the logical network differ from the connections of the physical network. For example, although end machines VMs 3 and 4 and PM 5 are connected to a single logical switch 325 in the logical network 300, they are all physically connected to different managed forwarding elements in the physical network 305. The MSFEs and MHFEs could reside in different machines, different subnets, or even different datacenters in different parts of the world. The managed forwarding elements implement the logical network by creating tunnels for communicating logical network data to other forwarding elements. Establishing tunnels that extend the logical network overlay among MSFEs and other physical switches is described in more detail below by reference to FIG. 4.

The network control system of some embodiments configures the forwarding elements of the physical network to implement the logical forwarding elements of the logical network by creating tunnels and modifying forwarding behaviors of the managed forwarding elements. In some embodiments, the MSFEs 355 and 360 and the MHFE 365 of the physical network implement the LFEs 320-230 through a set of flow entries for routing the packets of the logical network. Alternatively, or conjunctively, some or all of the managed forwarding elements are not flow-based software forwarding elements, but instead process packets based on configuration data that is generated by their respective local controllers.

Although, in the illustrated example, each managed forwarding element implements logical forwarding elements for a single logical network, in some embodiments, a managed forwarding element may be attached to machines for logical forwarding elements of different logical network. A single managed forwarding element can be configured to implement different logical networks for different tenants.

Figure 4:
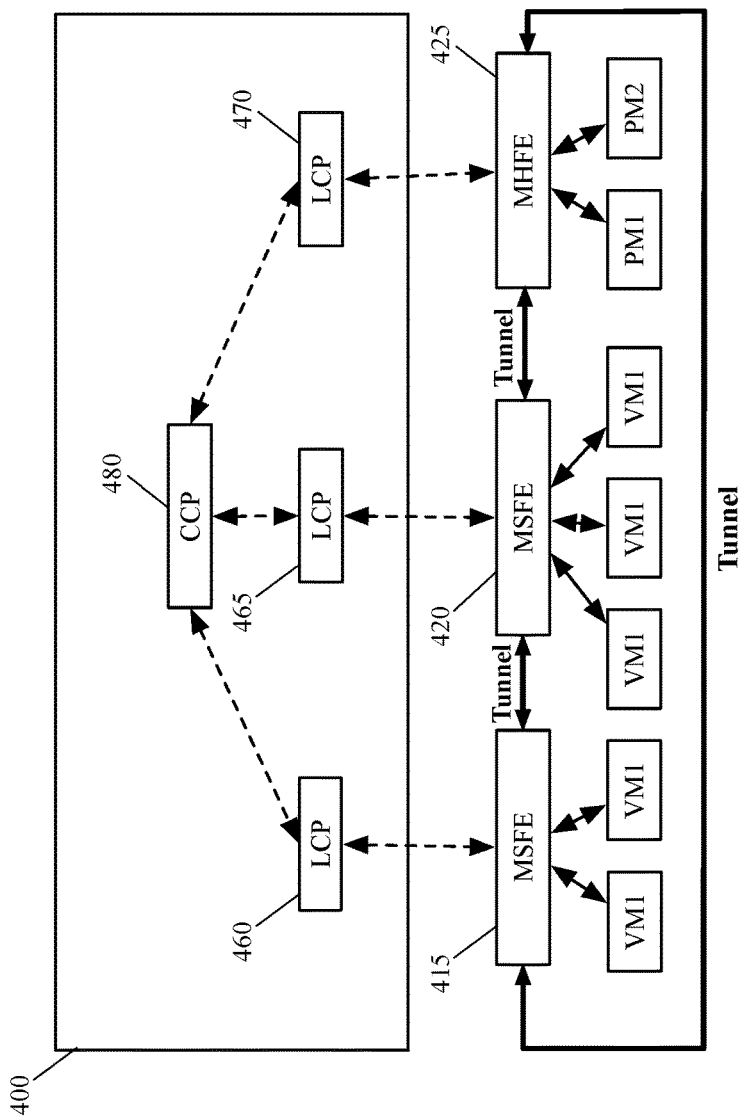
FIG. 4 illustrates an example of how the CCP cluster of some embodiments communicates with several forwarding elements (hardware and software) to implement one or more logical networks.

FIG. 4 illustrates an example of how the network control system of some embodiments communicates with several forwarding elements (hardware and software) 415-425 to implement one or more logical networks. Specifically, this figure shows a network control system 400 exchanging logical forwarding and configuration data with the forwarding elements to implement one or more logical forwarding elements and create tunnels between the various software and physical forwarding elements.

The network control system 400 of some embodiments includes a central controller 480 (or a cluster of central controllers), which manages local controllers 460, 465, and 470. The local controllers 460, 465, and 470 manage MSFEs 415 and 420 and MHFE 425 respectively. In some embodiments, the central controller 480 manages the logical network and communicates logical forwarding data to the local controllers 460, 465, and 470, which converts the logical forwarding data to physical forwarding data to configure the forwarding behaviors of the corresponding managed forwarding element. In some embodiments, the physical forwarding data includes data to encapsulate these packets in tunnels in order to send the packets to other managed forwarding elements.

In some embodiments, the local controllers are a separate software process from the central controller of the network control system. In different embodiments, a local controller may operate on the same machine as one of the central controllers, or on a different machine (e.g., in a separate virtual machine, on a separate physical device, etc.).

The local controller 470 for MHFE 425 of some embodiments communicates with the MHFE 425 over the OVSDB protocol to exchange forwarding state (e.g., L2 and/or L3 forwarding state). For instance, the MHFE 425 might send an update notification to the network control system (through the local controllers to the central controller) regarding a learned MAC address of a machine (e.g., desktop computer, laptop) that is connected to its port. The central controller 480 can then compute the necessary logical data and push this logical data down to the local controllers 415 and 420 for the MSFE. The MHFE 425 may also send statistical information regarding traffic, bandwidth, etc. for the various ports of the MHFE.

The MHFE 425 also receives configuration information from the local controller 425. For instance, the MHFE 425 might receive the MAC addresses of the machines 430 and 440 that are coupled to the MSFEs 415 and 420. The MHFE 425 of some such embodiments then calculates its own forwarding data based on the forwarding information it receives from the CCP cluster. The method of computation of the forwarding data by a physical switch can vary from one switch vendor to another.

In some embodiments, in addition to receiving the MAC addresses, each of the MHFEs serves as a tunnel endpoint in some embodiments, and receives addresses (e.g., IP addresses) of the other tunnel endpoints, as well as other information to use when encapsulating packets in the tunnels (e.g., logical network and logical port identifiers, etc.). In some embodiments, the MHFE 425 stores the tunnel endpoint addresses of the other MSFEs and MHFEs that implements the logical forwarding elements and their different logical ports in a particular tunnel endpoint locator table. The tunnel endpoint locator table is one of several database tables that are configured on the MHFE through a database schema (e.g., OVSDB) by the network control system. The MHFE 425 uses the received configuration data to locate other tunnel endpoints (through their IP addresses) and establish the tunnels between the TOR switch and the other endpoints.

Figure 5A:
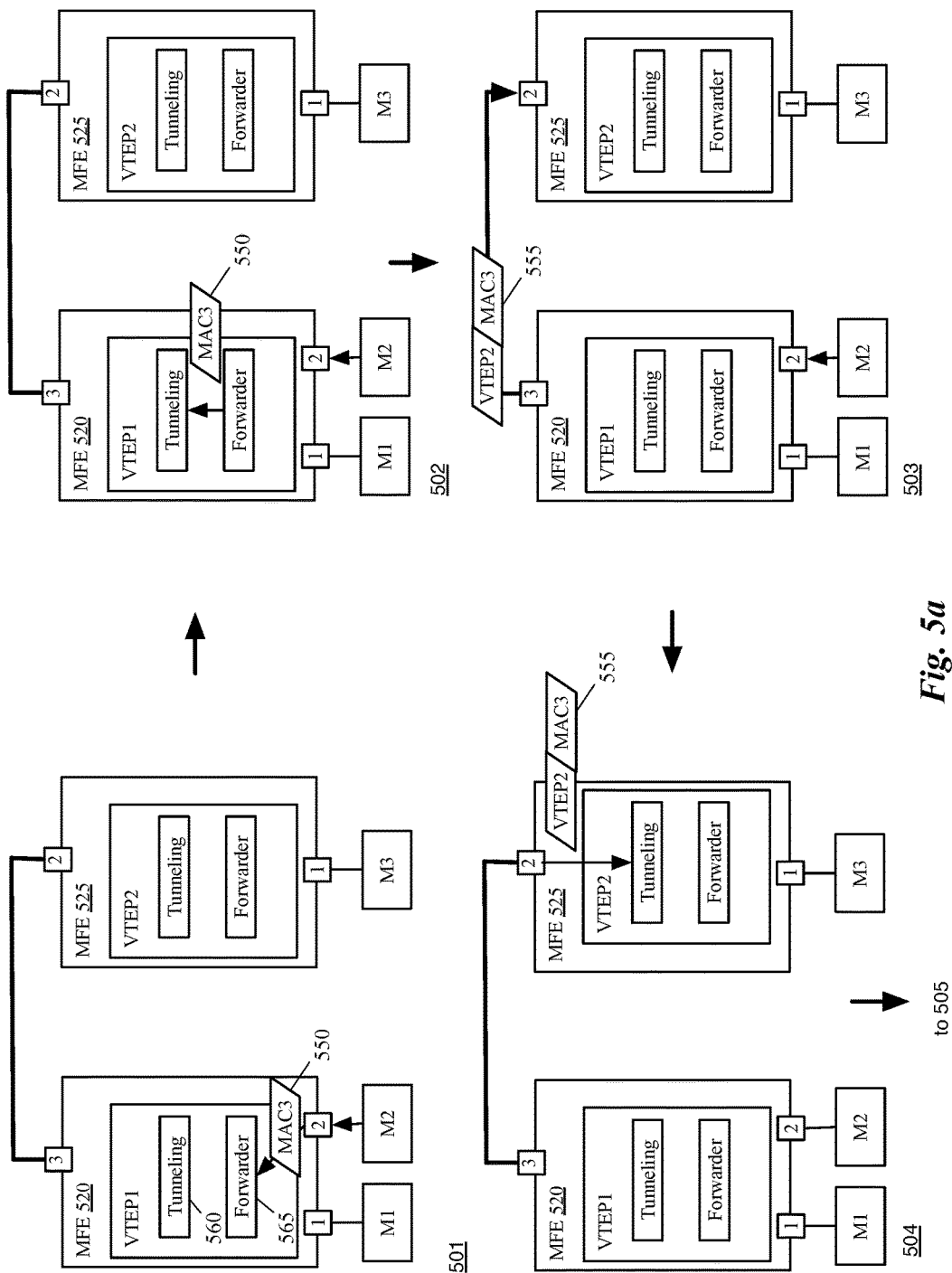
FIGS. 5a-b illustrate an example of the tunneling performed by the VTEP of an MHFE for packets through a logical network.
Figure 5B:
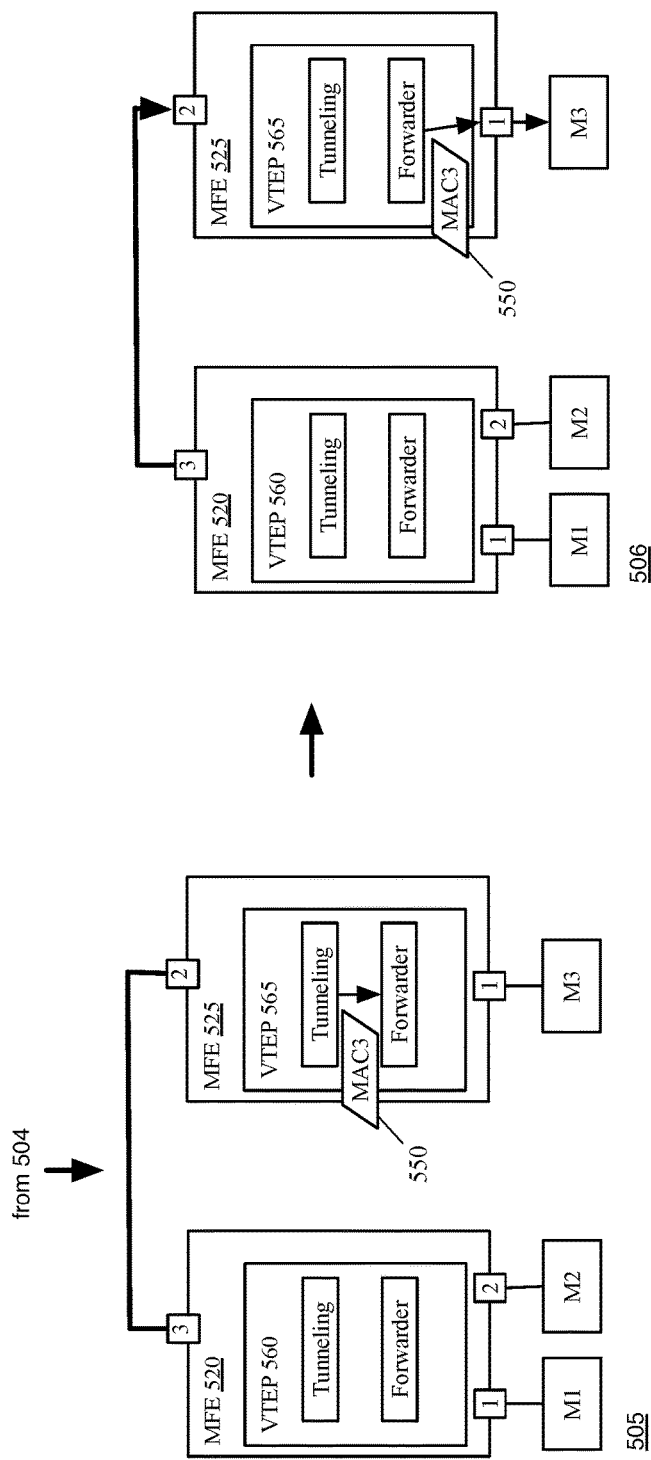

FIGS. 5*a-b* illustrate an example of the tunneling performed by the VTEP of an MHFE for packets through a logical network in six stages 501-506. This example shows two managed forwarding elements (MFEs) 520 and 525 with virtual tunnel end points VTEPs 1 and 2 respectively. Each VTEP shows a tunneling module 560 and a forwarder 565. Machines M1 and M2 are coupled to MFE 520, while machine M3 is coupled to MFE 525. The NIFEs 520 and 525 communicate logical network data through tunnels in the network.

The first stage 501 shows that machine M2 sends a data message 550 through port 2 of the MHFE 520 with a destination address MAC2. When the data message 550 is destined for another machine that is coupled to the MHFE 520, the forwarder 565 forwards the data message directly to the destination machine, without encapsulating the data message.

In this example, the forwarder 565 determines that the destination machine for the data message 550 is not located on the same MHFE 520. In some embodiments, the forwarder 565 determines whether a destination address is located on the same MHFE 520 based on a set of database configuration tables (not shown) that provide mappings between the logical and physical networks. The mappings of some embodiments identify the VTEP to which each logical port is connected. So, for example, if the data message 550 had a destination address of MAC1, which corresponds to the physical port of machine M1 on MHFE 520, then the forwarder 565 would send the packet directly to machine M1.

The second stage 502 shows that the forwarder 565 sends the data message 550 to a tunneling module 560, which performs tunneling for data messages through the network. In the second stage 502, the tunneling module performs a lookup on the configuration database tables to identify a location (i.e., the IP address) of the remote VTEP VTEP2 for the destination end machine M3, and encapsulates the data message 550 with headers that direct the data message 550 to the remote VTEP2.

The third stage 503 shows that the tunneling module 560 of VTEP1 has attached a new header, which indicates the network layer address (VTEP2) for the destination VTEP (VTEP2) of the MFE 525 that is attached to the destination machine M3. In the fourth stage 504, MFE 520 sends encapsulated data message 555 through the network to the destination VTEP (VTEP2). The destination VTEP receives the encapsulated data message 555 through port 3 of the MFE 525.

The fifth stage 505 shows that the tunneling module 560 of the destination VTEP2 removes the header from the encapsulated data message 555 and sends the decapsulated data message 550 to the forwarder 565. Finally, in the sixth stage 506, the forwarder 565 sends the data message 550 to the destination machine M3.

II. Weighting IP Aliases to Reduce ARP Requests

As described above, data messages for machines on the logical network are forwarded through the logical network based on addresses, such as IP and MAC addresses. In some embodiments, it is desirable to assign multiple IP addresses to a single interface for a machine. However, current implementations do not allow for attributing multiple addresses to a single interface for a hardware virtual tunnel end point (VTEP). If multiple IP addresses are assigned, but the hardware VTEP is only capable of handling a single address, the physical machine may generate excessive ARP requests. Each address that is not stored in the configuration database tables (or forwarding tables) of the VTEP will have no corresponding MAC address, and will require the MHFE to broadcast a new ARP request on the network.

Some embodiments of the invention alleviate the problem of excessive ARP requests. Not all IP aliases are used with the same frequency. For example, a logical interface may have an IP address that is primarily used, while other aliases are used as backups or for secondary services. The network control system of some embodiments applies a heuristic or an algorithm to associate weight to each of these IP addresses, and to identify a primary alias address to be configured into the configuration database tables (or VTEP forwarding tables).

Figure 6:
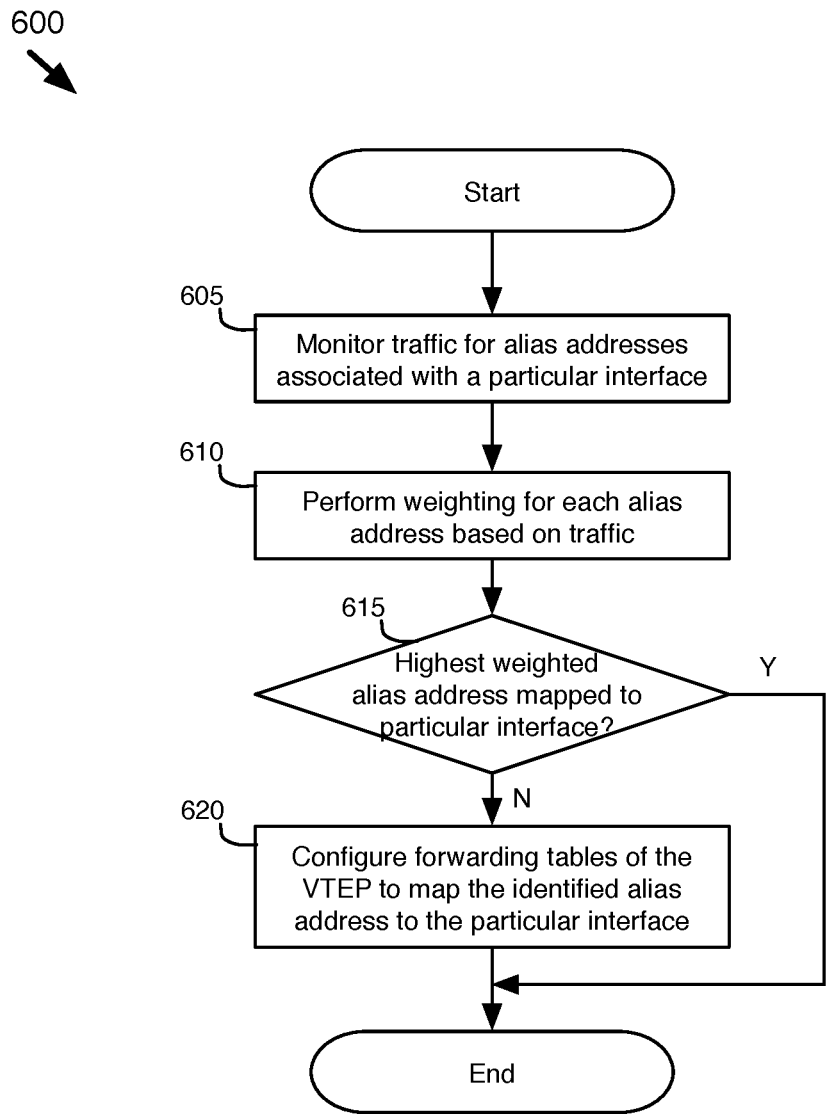
FIG. 6 conceptually illustrates a process for configuring forwarding tables of a VTEP for IP aliasing using weighted IP addresses.

FIG. 6 conceptually illustrates a process 600 for configuring configuration database tables (or VTEP forwarding tables) of a hardware VTEP to handle IP aliasing using weighted IP addresses. In some embodiments, the process 600 is performed by a controller that monitors the relative frequency of traffic to different alias addresses in the data plane, and associates weights with them, relative to one another.

As described with reference to FIG. 4, the local controllers of the network control system, in addition to configuring, receive statistics and other physical data (e.g., physical port status, etc.). In some embodiments, the central controllers and the local controllers use the statistics to weight the different alias addresses assigned to a logical port, based on the traffic destined for each alias address.

The process 600 monitors (at 605) the traffic for alias addresses associated with a particular interface. The process 600 of some embodiments monitors the traffic by periodically sampling the number of data messages sent to each alias address for each logical port.

The process 600 then performs (at 610) a weighting for each of the alias addresses based on the monitored traffic. In some embodiments, the weighting is a simple weighting calculation that assigns the weight based on the number of packets destined for each alias address. In some embodiments, the weighting is performed periodically, sampling a set of packets that are received for a particular duration of time. Other methods of weighting account for historical patterns, time of day, etc.

The process 600 then determines (at 615) whether the highest weighted alias address is already mapped to the particular interface. When the process 600 determines (at 615) that the highest weighted alias address is already mapped to the particular interface, the process 600 ends.

When the process 600 determines (at 615) that the highest weighted alias address is not mapped to the particular interface, the process 600 configures (at 620) forwarding tables of the VTEP to map the identified alias address to the particular interface. The process 600 then ends.

Figure 7:
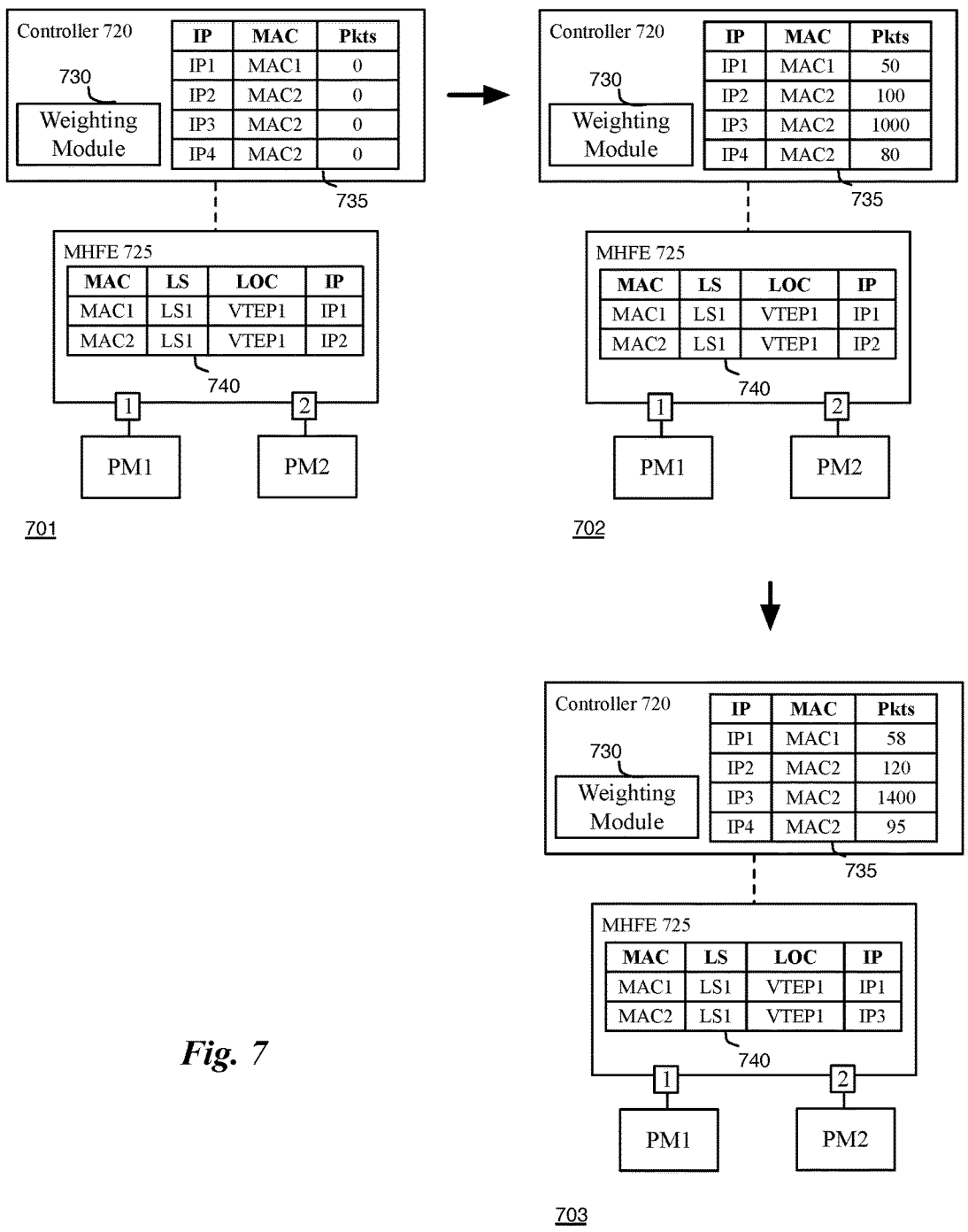
FIG. 7 illustrates an example of weighting alias IP addresses to alleviate ARP requests for a MHFE.

FIG. 7 illustrates an example of weighting alias IP addresses to alleviate ARP requests for a MHFE in three stages 701-703. The first stage 701 shows a controller 720

(e.g., central controller or local controller of the network control system) that manages MHFE 725. MHFE 725 is coupled to physical machines PM1 and PM2 through ports 1 and 2 of MHFE 725.

The controller 720 includes a weighting module 730 and monitoring table 735. The monitoring table 735 shows, for each MAC address managed by the controller 720, the associated alias addresses and the number of packets sent to each alias address. In this example, the monitoring table 735 shows that data link address MAC2 has three alias addresses IP2-IP4. In the first stage 701, no packets have yet been monitored by the controller 720.

The MHFE 725 includes a logical mapping table 740. The logical mapping table 740 stores the mappings of the different MAC and IP addresses of the logical network, as well as the corresponding logical switch for each. The logical mapping table 740 of some embodiments is used to provide ARP suppression for the logical network.

In some embodiments, the logical mapping table 740 is one of many configuration database tables (or VTEP forwarding tables) stored in the hardware VTEPs. In some embodiments, the configuration database is structured according to a standardized schema that allows a network control system to configure the tables of the VTEP.

The second stage 702 shows that the controller 720 monitors traffic between the MHFE 725 and the other managed forwarding elements (not shown) of the network. The controller 720 counts the packets to each alias address (IP1-IP4). The weighting module 730 then uses the monitored traffic to weight the different alias addresses and to identify a primary alias for each aliased MAC address. In this example, of the three alias addresses (IP2-IP4) assigned to MAC2, IP3 has received the most traffic (1000 packets). In some embodiments, the weighting module 730 performs a simple weighting that assigns the highest value to the IP address with the most received packets.

The third stage 703 shows that the weighting module has selected IP3 as the primary address for MAC2, and has modified the logical mapping table 730 to associate the primary address IP3 with MAC2.

By modifying the logical mapping table 730 with the primary address IP3, the system should be able to minimize the number of ARP requests sent to the machine with L2 address MAC2, alleviating some of the excess ARP requests propagated through the system. In addition, this solution does not require any changes to the schema or to the hardware VTEPs, but the lesser used alias addresses would still require the ARP mechanism.

III. ARP Suppression by MHFEs for a Logical Network

Figure 8:
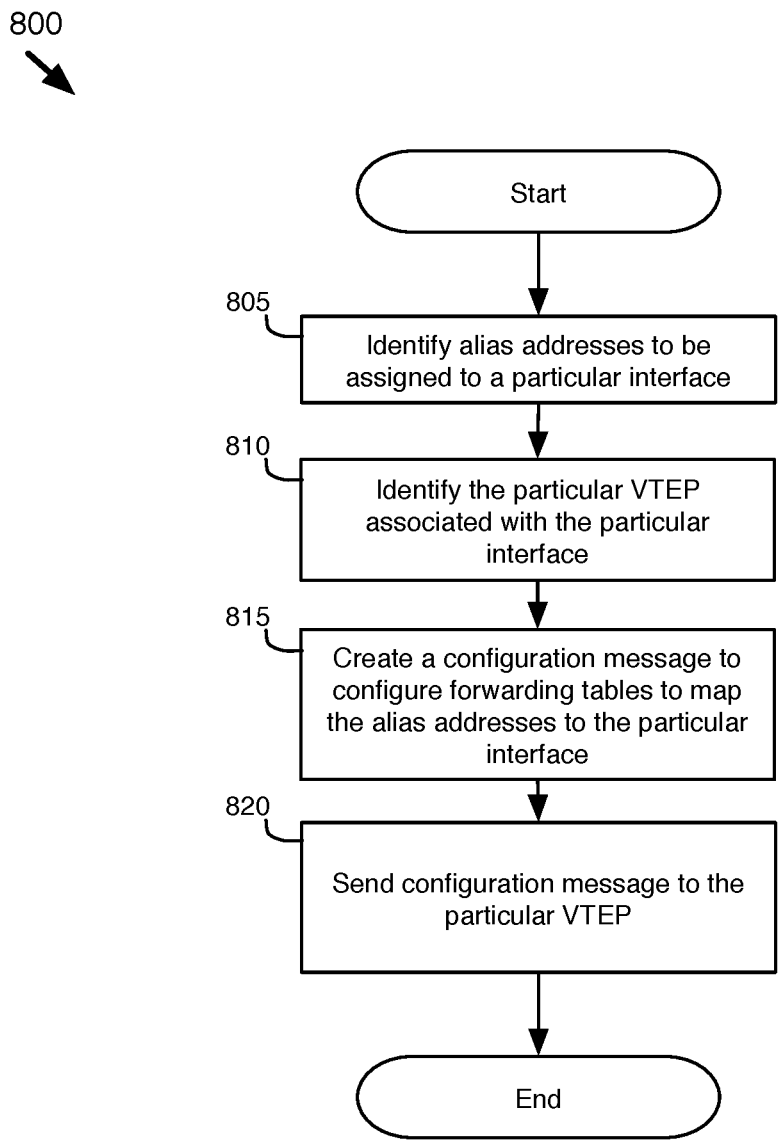
FIG. 8 conceptually illustrates a process for configuring an interface with multiple IP addresses.

In some embodiments, rather than simply alleviating the problem, the controller modifies the MHFEs to eliminate the problem altogether. FIG. 8 conceptually illustrates a process for assigning multiple IP addresses to a single interface for a MHFE. In some embodiments, the process 800 is performed by a controller of the network control system. The process 800 begins by identifying (at 805) multiple alias addresses to be assigned to a particular interface in the logical network. In some embodiments, the alias addresses are assigned by a user (e.g., administrator, tenant, etc.) of the network control system.

The process 800 also identifies (at 810) the particular VTEP associated with the particular logical interface. In some embodiments, the process 800 performs a lookup on mappings of logical interfaces with physical ports to identify the particular VTEP for the managed forwarding element that is connected to the logical interface.

The process 800 then creates (at 815) a configuration message to configure forwarding tables to map the alias addresses to the particular interface in the logical network. Various examples of configurations of the forwarding tables are described below with reference to FIGS. 10-12.

The process 800 then sends the configuration message to the particular VTEP (or MHFE) to configure the VTEP to properly handle the multiple IP aliases for the particular interface. In some embodiments, the process 800 uses a standardized configuration database protocol that is used by manufacturers of third-party forwarding elements (e.g., OVSDB).

Figure 9:
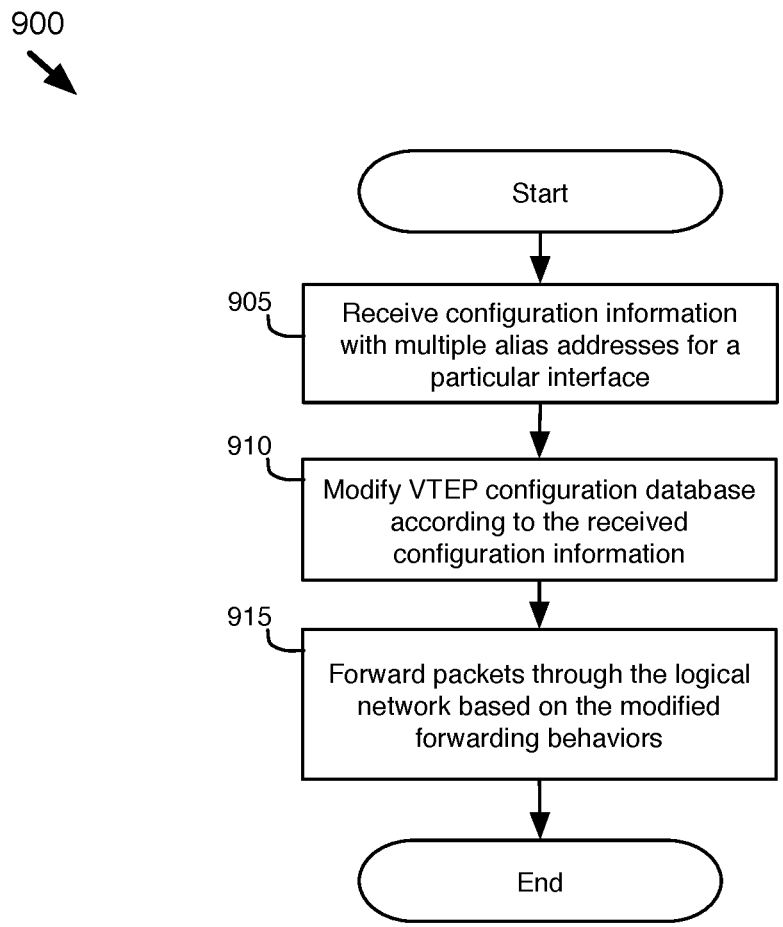
FIG. 9 conceptually illustrates a process for a MHFE to implement IP aliasing.

Once the configuration message is sent to the particular VTEP, the VTEP (or MHFE) configures itself to handle multiple alias addresses. FIG. 9 conceptually illustrates a process for a MHFE to implement IP aliasing. The process 900 receives (at 905) configuration information with multiple IP addresses for a particular interface in the logical network. The received configuration information of some embodiments is generated by a controller (e.g., central controller, local controller, etc.) of the network control system according to the process as described above with reference to FIG. 8.

The process 900 then modifies (at 910) the forwarding behaviors of the MHFE according to the received configuration information. In some embodiments, the process 900 modifies (at 910) the forwarding behaviors of the MHFE by modifying a set of mapping tables (or forwarding tables) in the VTEP. The mapping tables describe mappings between logical ports of the logical forwarding elements, as well as data link layer and network layer addresses for the machines attached to the logical ports. The mapping tables of some embodiments also include mappings to physical ports of the managed forwarding elements. In some embodiments, modifying the forwarding behaviors includes modifying the mapping tables to perform ARP suppression for the logical interfaces at the hardware VTEPs. Examples of such modifications are described with reference to FIGS. 10-12.

Figure 10:
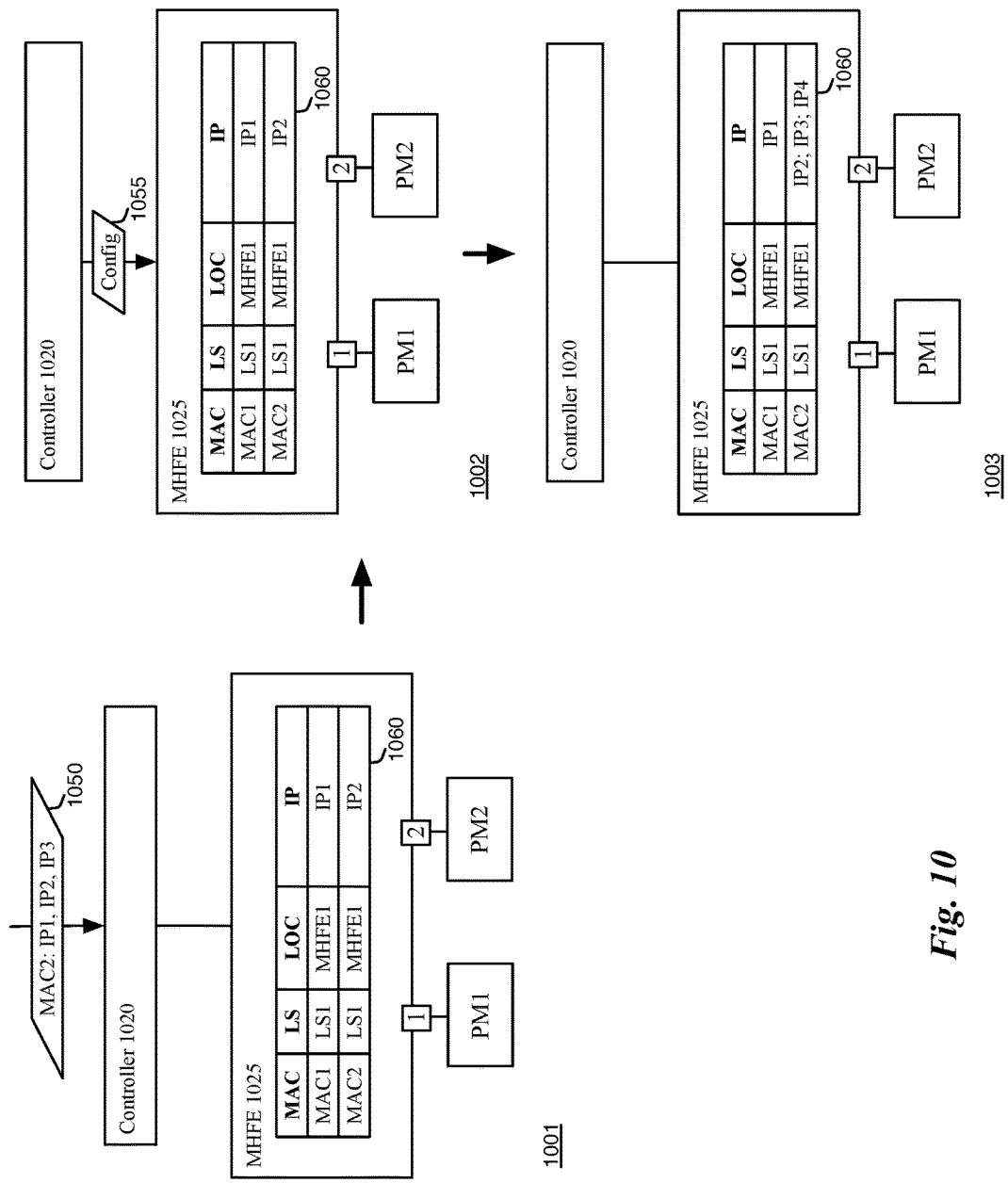
FIG. 10 illustrates an example of implementing IP aliasing using delimiters.
Figure 11:
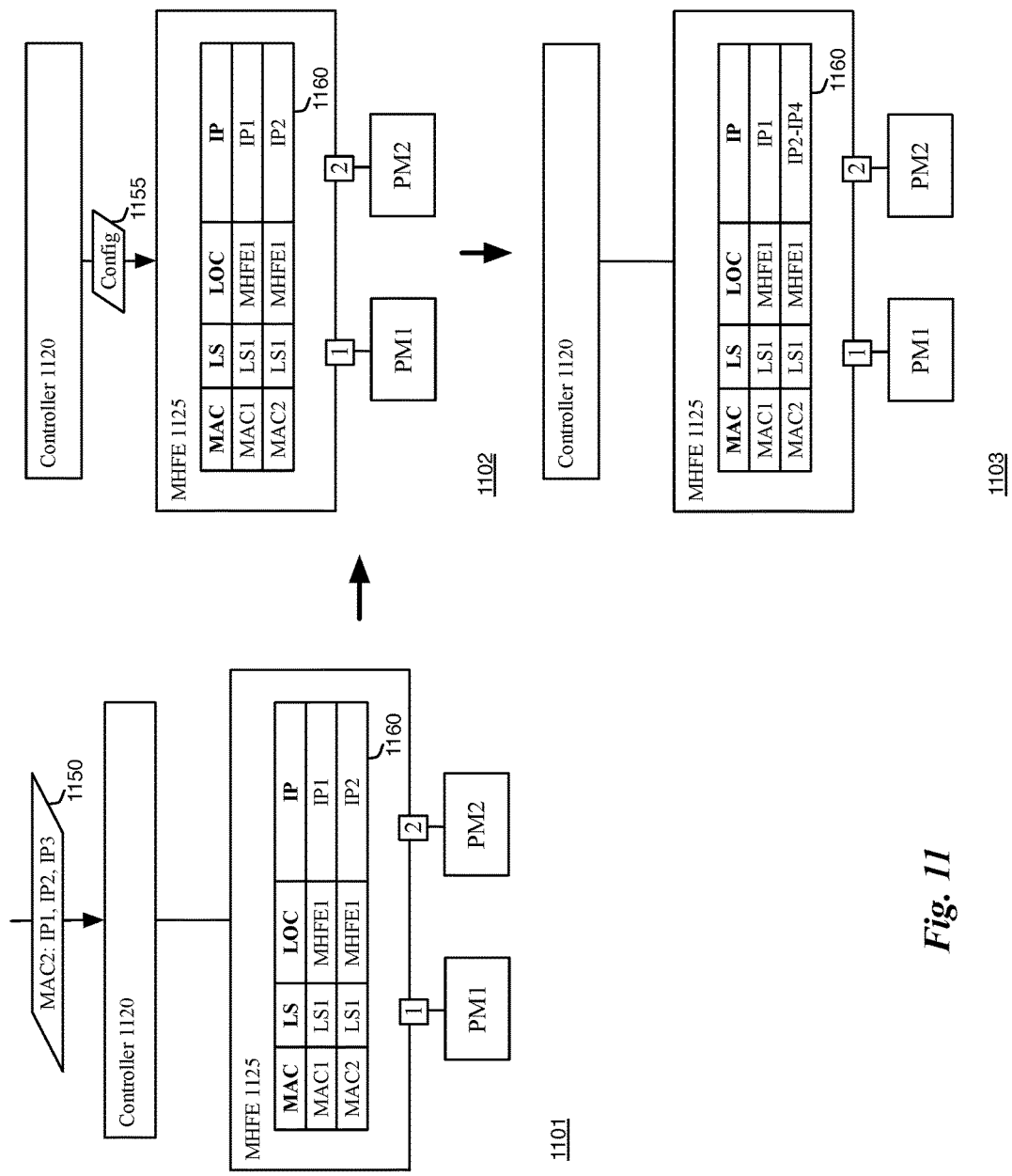
FIG. 11 illustrates an example of implementing IP aliasing using ranges.
Figure 12:
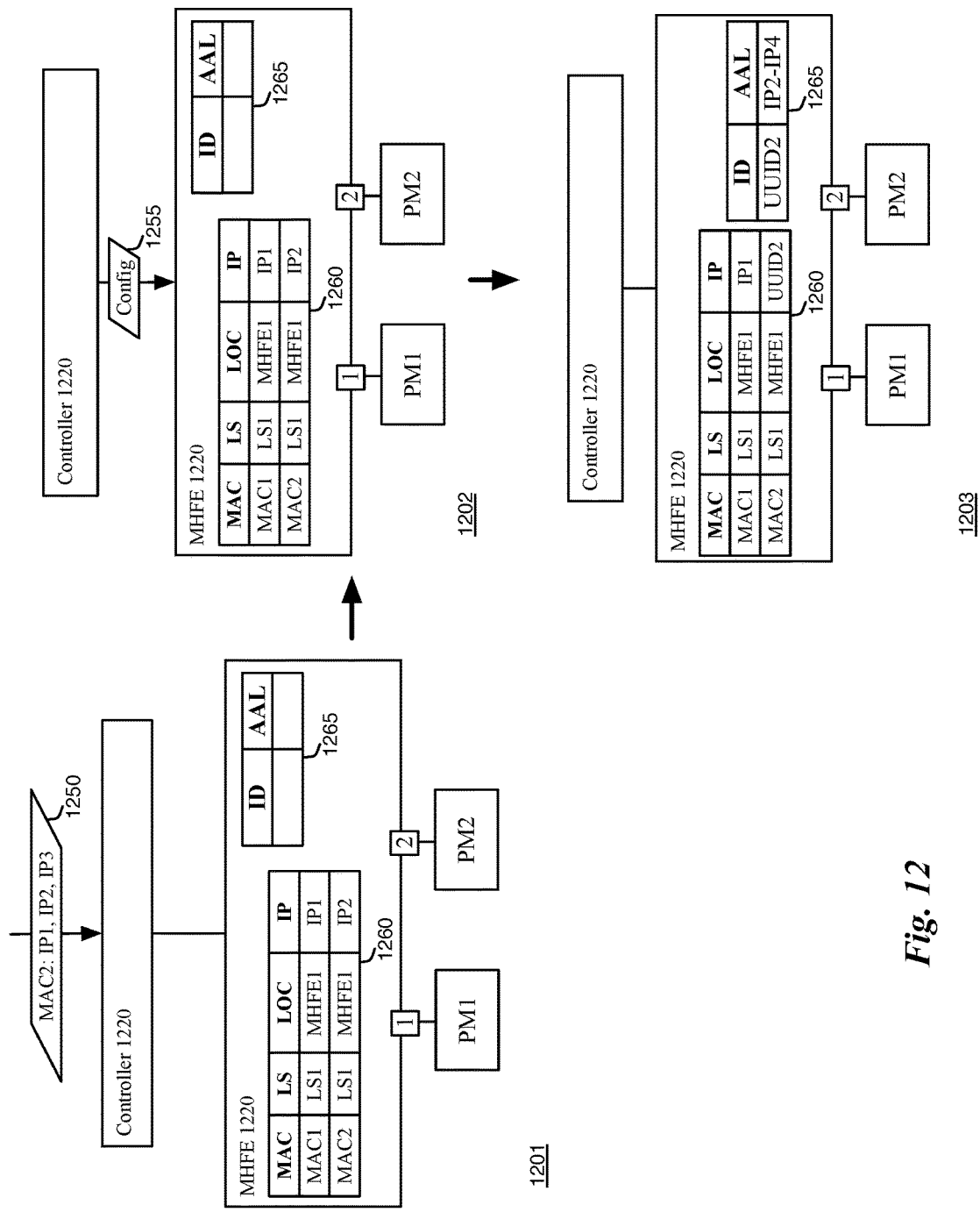
FIG. 12 illustrates an example of implementing IP aliasing using additional tables.

FIGS. 10-12 illustrate examples of three different methods for configuring hardware VTEPs to provide ARP suppression for aliased addresses for an interface in a logical network. FIG. 10 illustrates an example of implementing IP aliasing using delimiters in three stages 1001-1003. In some embodiments, the MAC addresses are for remote machines in the logical network.

The first stage 1001 shows that controller 1020 receives input 1050. The input 1050 shows that data link address MAC2 is to be assigned three network layer addresses IP1-IP3. In some embodiments, the input 1050 is received from a user (e.g., a network administrator, tenant etc.) of the system through a user interface for the controller 1020.

In the second stage 1002, the controller 1020 then processes the input 1050 to create a configuration message 1055. In some embodiments, the controller 1020 uses a configuration protocol (e.g., OVSDB) that is used for configuring databases of hardware and software managed forwarding elements to communicate the configuration message 1055 to the MHFE 1025.

The third stage 1003 shows that "IP" column of the VTEP forwarding table 1060 for data link layer address MAC2 has been modified to show a delimited list ("IP2; IP3; IP4") of network layer addresses IP2-IP4. In some embodiments, the delimited list uses a special character (e.g., ";") that is not used in network layer addresses to separate the different network layer addresses assigned to the particular L2 address. By using a single delimited list, the schema for the VTEP forwarding table 1060 does not need to be modified at all.

In some embodiments, the delimited list is included as a part of the configuration message 1055, which the MHFE 1025 stores in the VTEP forwarding table 1060. Alternatively, in some embodiments, the configuration message 1055 simply includes a listing of the addresses, and the MHFE 1025 is configured to generate a delimited list based on configuration message 1055 and to store the generated delimited list in the VTEP forwarding table 1060.

FIG. 11 illustrates an example of implementing IP aliasing using ranges. Like FIG. 10, the first stages 1101 and 1102 show that the controller 1120 receives input 1150 and processes the input 1150 to create a configuration message 1155. However, rather than a delimited list, the third stage 1103 shows that the VTEP forwarding table 1160 has been modified based on the configuration message 1155 to describe an address range. The address range provides a shorthand description (e.g., "192.168.1.1-192.168.1.4", etc.) to indicate all addresses between a first and last address. The address range can include many more addresses than a delimited address list in less space. However, the address range is only useful for consecutive groups of addresses. Although the examples of FIGS. 10 and 11 are shown separately, it would be clear to one skilled in the art that both methods could be used together to create a delimited list of both addresses and address ranges (e.g., "IP2-IP4;IP7;IP8-IP11").

FIG. 12 illustrates an example of implementing IP aliasing using additional tables. Similar to FIGS. 10 and 11, the first two stages 1201 and 1202 show that the controller 1220 receives input 1250 and processes the input 1250 to create a configuration message 1255. However, unlike the previous examples, the example of FIG. 12 shows, in addition to the VTEP forwarding table 1260, an alias address table 1265. The alias address table 1265 has an ID column and an IP column for storing network layer addresses.

Once the controller 1220 sends the configuration message 1255 to the MHFE 1225, the MHFE 1225 modifies configuration tables 1260 and 1265 to make associations between the alias network layer addresses and the L2 address MAC2. In this example, the MHFE 1225 replaces the network layer address stored in Alias Address List (AAL) column of the VTEP forwarding table 1260 with a unique ID (e.g., UUID) for the interface. Each record in the alias address table 1265 stores a set of alias addresses in the AAL column for each UUID (which corresponds to a MAC address in the VTEP forwarding table 1260). The set of alias addresses may be stored in the form of address ranges, delimited lists, or a combination of both.

In some embodiments, rather than a single record for the alias addresses, the MHFE 1225 creates separate records in the alias address table 1265 using the unique ID as a key for each of the alias addresses.

In some embodiments, all of the alias addresses in the VTEP forwarding table 1260 are replaced with unique IDs that point to entries in the alias address table 1265. Alternatively, in some embodiments, only the L3 addresses that implement IP aliasing (i.e., have multiple alias addresses) are replaced with unique IDs, while the remaining entries maintain a single network layer address for the MAC address.

Finally, referring back to FIG. 9, once the VTEP forwarding tables have been configured with the alias addresses, the process 900 then forwards (at 915) data messages through tunnels of the logical network based on the modified forwarding tables of the VTEP. The modified forwarding behaviors allow the MHFE to perform ARP suppression for all alias addresses for each logical interface, avoiding unnecessary ARP requests.

In some embodiments, the weighting described in Section II is used in conjunction with the various methods described in Section III. For example, in some embodiments, the new columns that are added to the configuration database schema are weighted according to the frequency of use and the addresses in the address lists are ordered, or given priority, based on the weightings.

IV. System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
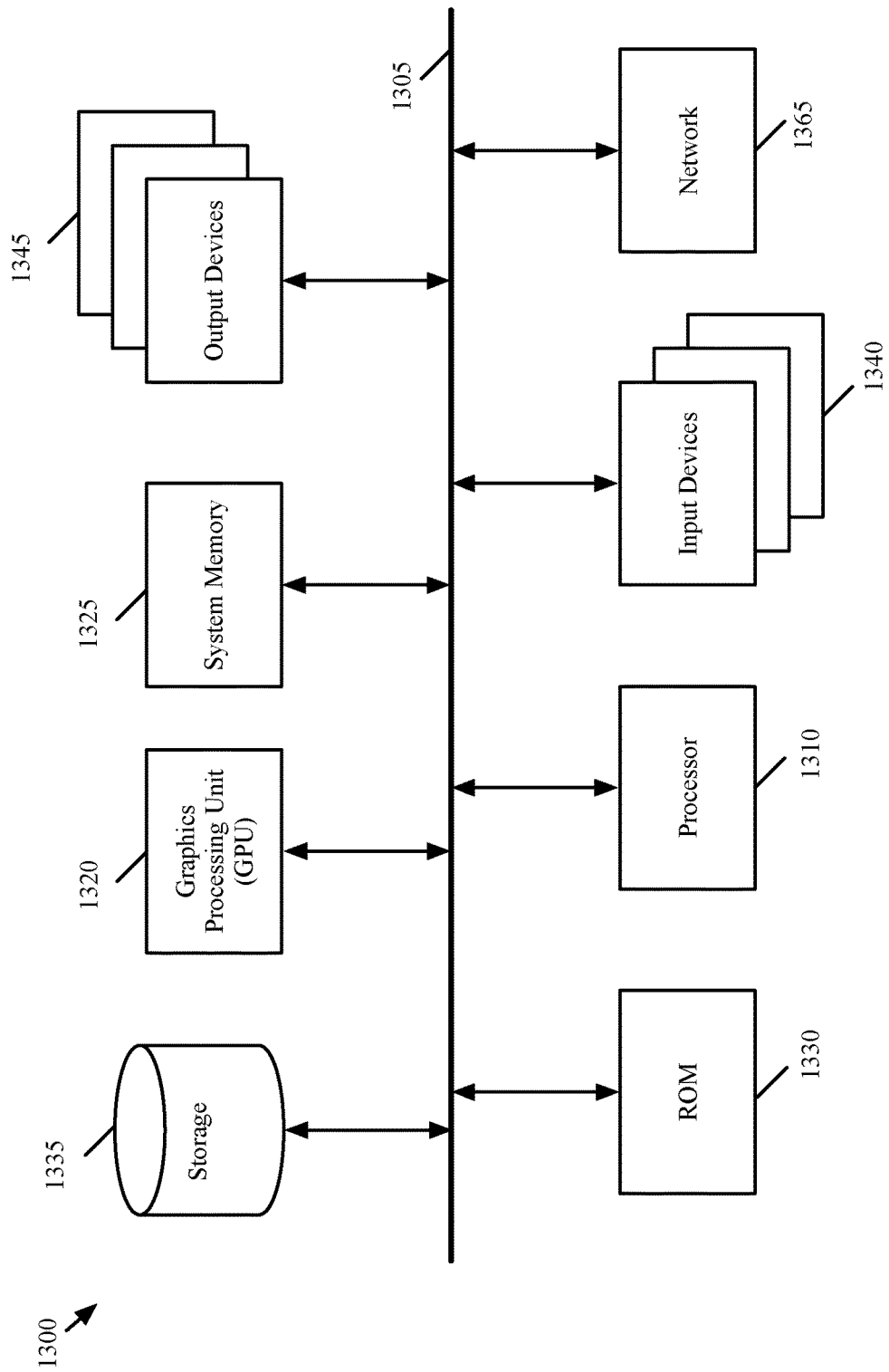
FIG. 13 conceptually illustrates an electronic system with which some embodiments of the invention are implemented.

FIG. 13 conceptually illustrates an electronic system 1300 with which some embodiments of the invention are implemented. The electronic system 1300 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieves instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash memory device, etc., and its corresponding drive) as the permanent storage device. Like the permanent storage device 1335, the system memory 1325 is a read-and-write memory device. However, unlike storage device 1335, the system memory 1325 is a volatile read-and-write memory, such a random access memory. The system memory 1325 stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

The term "packet" is used throughout this application to refer to a collection of bits in a particular format sent across a network. It should be understood that the term "packet"

may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A non-transitory machine readable medium storing a program which when executed by at least one processing unit associates a plurality of addresses with a logical network interface in a logical network, the logical network implemented on a set of hardware forwarding elements, the program comprising:
    identifying a plurality of logical addresses to assign to a machine of the logical network, the machine attached to a particular port of a particular hardware forwarding element of the set of hardware forwarding elements; and
    modifying a set of associations stored in a set of tables of the particular hardware forwarding element to associate the particular port with the plurality of logical addresses, said set of instructions for modifying comprising sets of instructions for:
        generating a string representing a range of consecutive logical addresses of the plurality of logical addresses; and
        storing the generated string in the set of tables, wherein the particular hardware forwarding element identifies a MAC address associated with the range of consecutive logical addresses based on the stored generated string.

2. The non-transitory machine readable medium of claim 1, wherein the set of instructions for identifying the logical addresses comprises a set of instructions for receiving user input that assigns the logical addresses to the machine.

3. The non-transitory machine readable medium of claim 1, wherein the logical addresses are Internet Protocol (IP) addresses.

4. A non-transitory machine readable medium storing a program which when executed by at least one processing unit associates a plurality of addresses with a logical network interface in a logical network, the logical network implemented on a set of hardware forwarding elements, the program comprising sets of instructions for:
    identifying a plurality of logical addresses to assign to a machine of the logical network, the machine attached to a particular port of a particular hardware forwarding element of the set of hardware forwarding elements; and
    modifying a set of associations stored in a set of tables of the particular hardware forwarding element to associate the particular port with the plurality of logical addresses, said set of instructions for modifying comprising sets of instructions for:
        generating a delimited string of the plurality of logical addresses; and
        storing the delimited string in the set of tables, wherein the particular hardware forwarding element identifies a MAC address associated with the plurality of logical addresses based on the stored delimited string.

5. The non-transitory machine readable medium of claim 4, wherein the delimited string of logical addresses further comprises at least one substring representing a range of consecutive logical addresses of the plurality of logical addresses.

6. The non-transitory machine readable medium of claim 1, wherein the set of associations are for mapping a Media Access Control (MAC) address to a set of IP addresses.

7. The non-transitory machine readable medium of claim 1, wherein the particular hardware forwarding element is one of a router and a switch.

8. The non-transitory machine readable medium of claim 7, wherein the particular hardware forwarding element is a top-of-rack (TOR) switch in a rack.

9. The non-transitory machine readable medium of claim 8, wherein the particular port of the TOR switch is coupled to a rack server on the rack.

10. The non-transitory machine readable medium of claim 9, wherein the set of associations further comprises bindings with a logical switch of a plurality of logical switches that operates on the particular hardware forwarding element.

11. A method for associating a plurality of addresses with a logical network interface in a logical network, the logical network implemented on a set of hardware forwarding elements, the method comprising:
    identifying a plurality of logical addresses to assign to a machine of the logical network, the machine attached to a particular port of a particular hardware forwarding element of the set of hardware forwarding elements; and
    modifying a set of associations stored at the particular hardware forwarding element to associate the particular port with the plurality of logical addresses, said modifying comprising:
        generating a string representing a range of consecutive logical addresses of the plurality of logical addresses; and
        storing the generated string in the set of tables, wherein the particular hardware forwarding element identifies a MAC address associated with the range of consecutive logical addresses based on the stored generated string.

12. The method of claim 11, wherein identifying the logical addresses comprises receiving user input that assigns the logical addresses to the machine.

13. The method of claim 11, wherein the logical addresses are Internet Protocol (IP) addresses.

14. A method for associating a plurality of addresses with a logical network interface in a logical network, the logical network implemented on a set of hardware forwarding elements, the method comprising:
    identifying a plurality of logical addresses to assign to a machine of the logical network, the machine attached to a particular port of a particular hardware forwarding element of the set of hardware forwarding elements; and
    modifying the set of associations stored at the particular hardware forwarding element to associate the particular port with the plurality of logical addresses, said modifying comprising:
        generating a delimited string of the plurality of logical addresses; and
        storing the delimited string in the set of tables, wherein the particular hardware forwarding element identifies a MAC address associated with the plurality of logical addresses based on the stored delimited string.

15. The method of claim 14, wherein the delimited string of logical addresses further comprises at least one substring representing a range of consecutive logical addresses of the plurality of logical addresses.

\* \* \* \* \*